United States Patent
Justice (12)

(10) Patent No.: US 8,465,216 B2
(45) Date of Patent: Jun. 18, 2013

(54) CAMERA MOUNTING ASSEMBLY

(76) Inventor: Jeff Justice, West Des Moines, IA (US)

(*) Notice: Subject to any disclaimer, the term of this patent is extended or adjusted under 35 U.S.C. 154(b) by 97 days.

(21) Appl. No.: 13/026,178

(22) Filed: Feb. 11, 2011

(65) Prior Publication Data

US 2012/0207462 A1 Aug. 16, 2012

(51) Int. Cl.
*G03B 17/00* (2006.01)
(52) U.S. Cl.
USPC ........ 396/423; 249/125.2; 249/160; 396/418; 396/422; 396/424; 396/428
(58) Field of Classification Search
USPC ................ 16/29; 181/200; 211/8, 89.01, 100, 211/124, 171; 248/121–126, 160, 372.1, 248/643; 292/11, 219; 396/329, 419–425, 396/428; 600/38
See application file for complete search history.

(56) References Cited

U.S. PATENT DOCUMENTS

| | | | |
|---|---|---|---|
| 7,954,773 B2* | 6/2011 | Carnevali | 248/160 |
| 2009/0057053 A1* | 3/2009 | Hsieh et al. | 181/199 |
| 2010/0220992 A1* | 9/2010 | Bevirt | 396/428 |
| 2010/0308198 A1* | 12/2010 | Bevirt | 248/440.1 |
| 2011/0023238 A1* | 2/2011 | Orzeck et al. | 7/118 |
| 2012/0207463 A1* | 8/2012 | Sherwood | 396/428 |

* cited by examiner

*Primary Examiner* — Clayton E LaBalle
*Assistant Examiner* — Kevin Butler
(74) *Attorney, Agent, or Firm* — Yu-Jui Ray Wu

(57) ABSTRACT

An apparatus for mounting a recording device onto a preexisting sex toy is provided. In one embodiment, the apparatus allows a camera mounting enclosure that is connected to a swiveling member that can be rotated upside down so that a standard digital camera can be mounted onto a screw embedded in the camera mounting enclosure. In other embodiments, a pair of gripper arms mounted onto the camera mounting enclosure can be adjusted to different widths that allows for camera phones to be securely held. The gripper arms can also secure an adapter that allows for a web cam to be mounted onto the adapter.

16 Claims, 6 Drawing Sheets

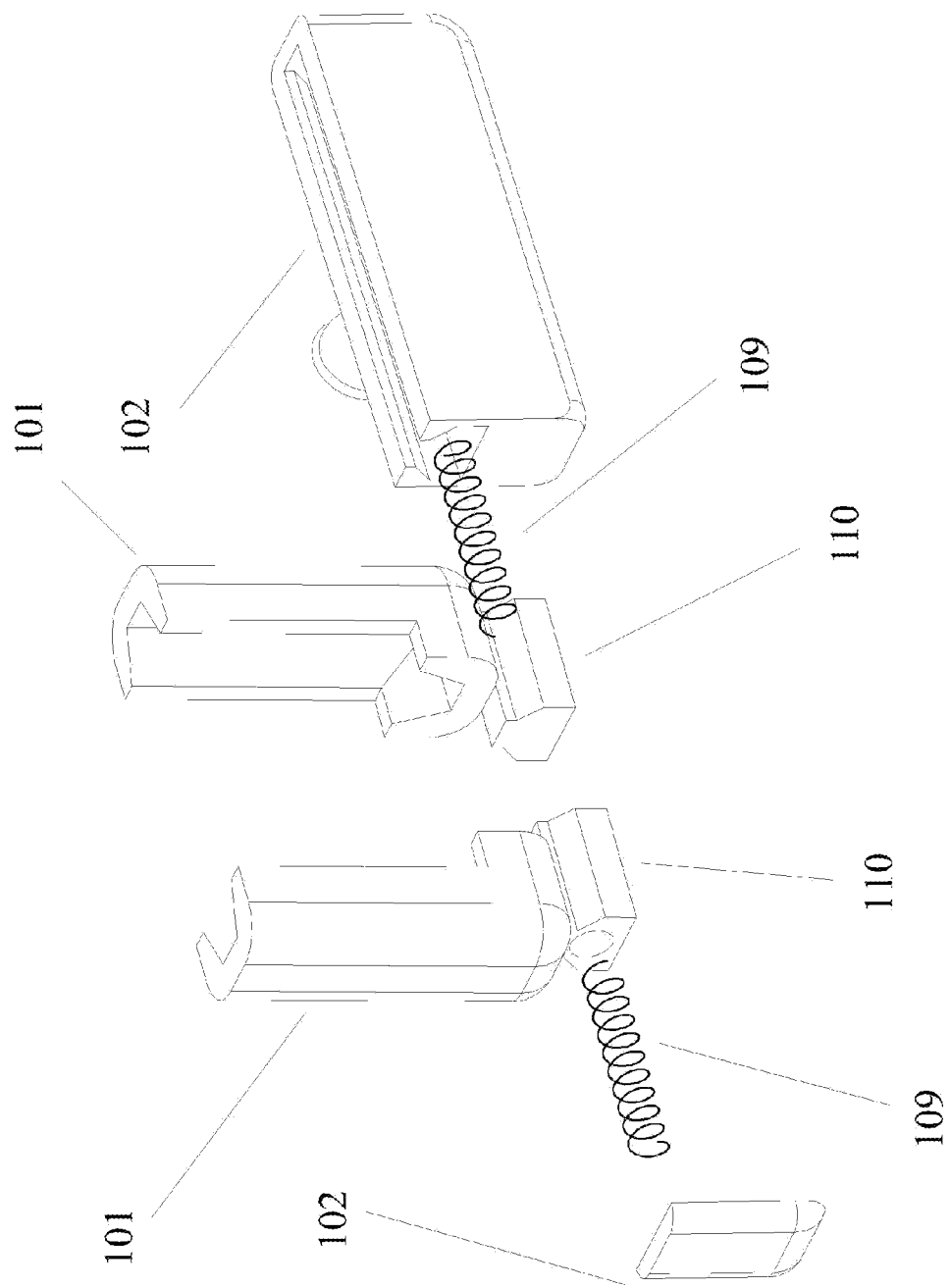

US 8,465,216 B2

CAMERA MOUNTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to a mounting device that allows a recording device that can record both audio and video files to be mounted to a sex toy that allows for highly zoomed in visuals of the use of sex toy. The mounting device is capable of holding a multitude of recording devices, including devices that save the files directly or can broadcast the files via Bluetooth or the internet.

2. Description of Related Art

There is existing prior art that addresses incorporating a camera either directly onto the toy or using the toy itself as a camera. The prior art does not address a device that can be attached to a toy and allows multiple types of cameras to be mounted to the device.

U.S. Publication No. 2004/0082831 by Kobashikawa discloses a toy that can be remote controlled and allows for a camera to be embedded into the liner of a toy. US Publication No. 2007/0055096 by Berry discloses a toy that itself can function as a device for communicating audio and video files.

BRIEF SUMMARY OF THE INVENTION

The present invention relates to a camera mounting device for a sex toy that includes an attaching strap made of Velcro that allows the device to be attached to a preexisting sex toy. The attaching strap is woven into a solid connecting plate that can be molded with a flexible swiveling member which joins the camera mounting enclosure to the connecting plate. The camera mounting enclosure has a screw for mounting a digital camera on one side of the enclosure and a pair of gripper arms on the open side of the camera mounting enclosure that can hold a camera phone. An adapter can be held by the pair of gripper arms that also allows a web camera to be mounted on the device.

BRIEF DESCRIPTION OF THE SEVERAL VIEWS OF THE DRAWINGS

The invention may take form in certain components and structures, preferred embodiments of which are illustrated in the accompanying drawings which form a part hereof and wherein:

FIG. 6 is a view of the inner construction of the gripper arms and how they are connected to the camera mounting assembly.

DETAILED DESCRIPTION OF THE INVENTION

Figure 1:
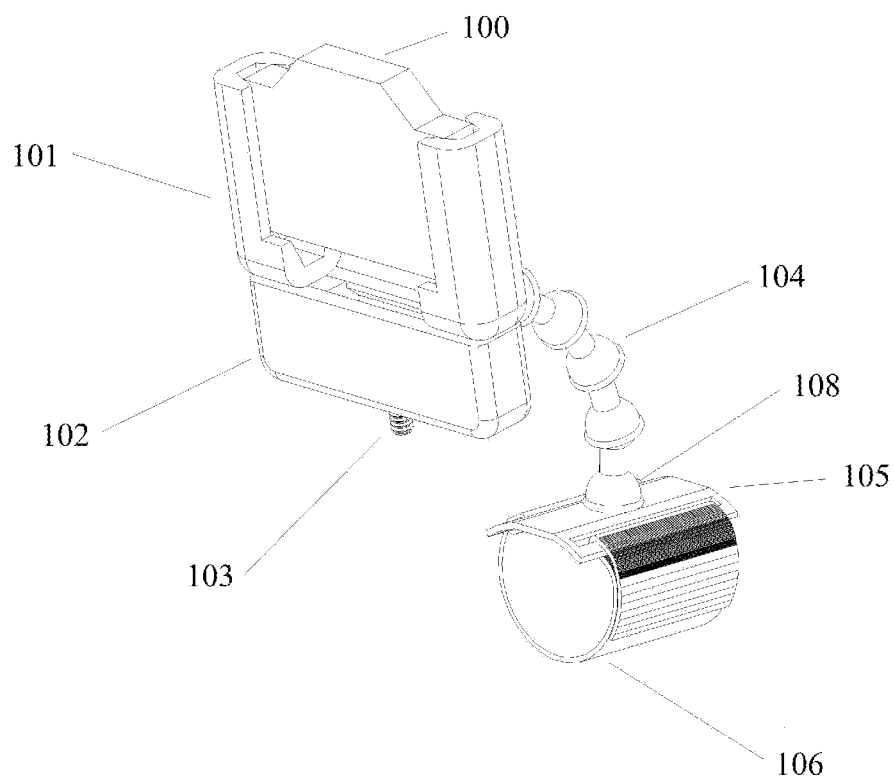
FIG. 1 is a front oblique view of the camera mounting assembly.
Figure 2:
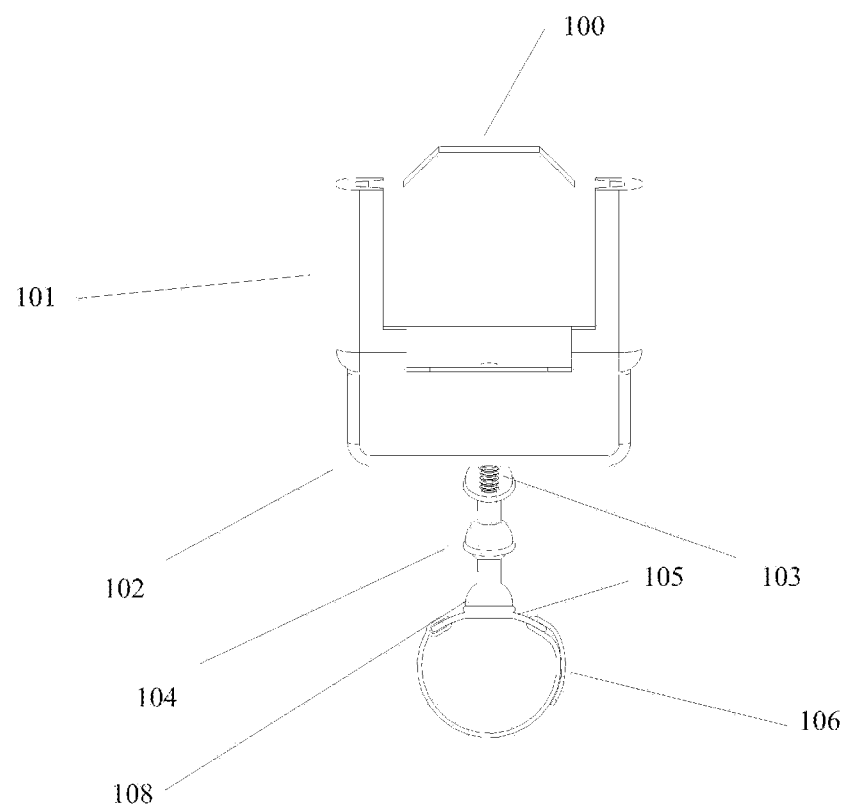
FIG. 2 is a front view of the camera mounting assembly.
Figure 3:
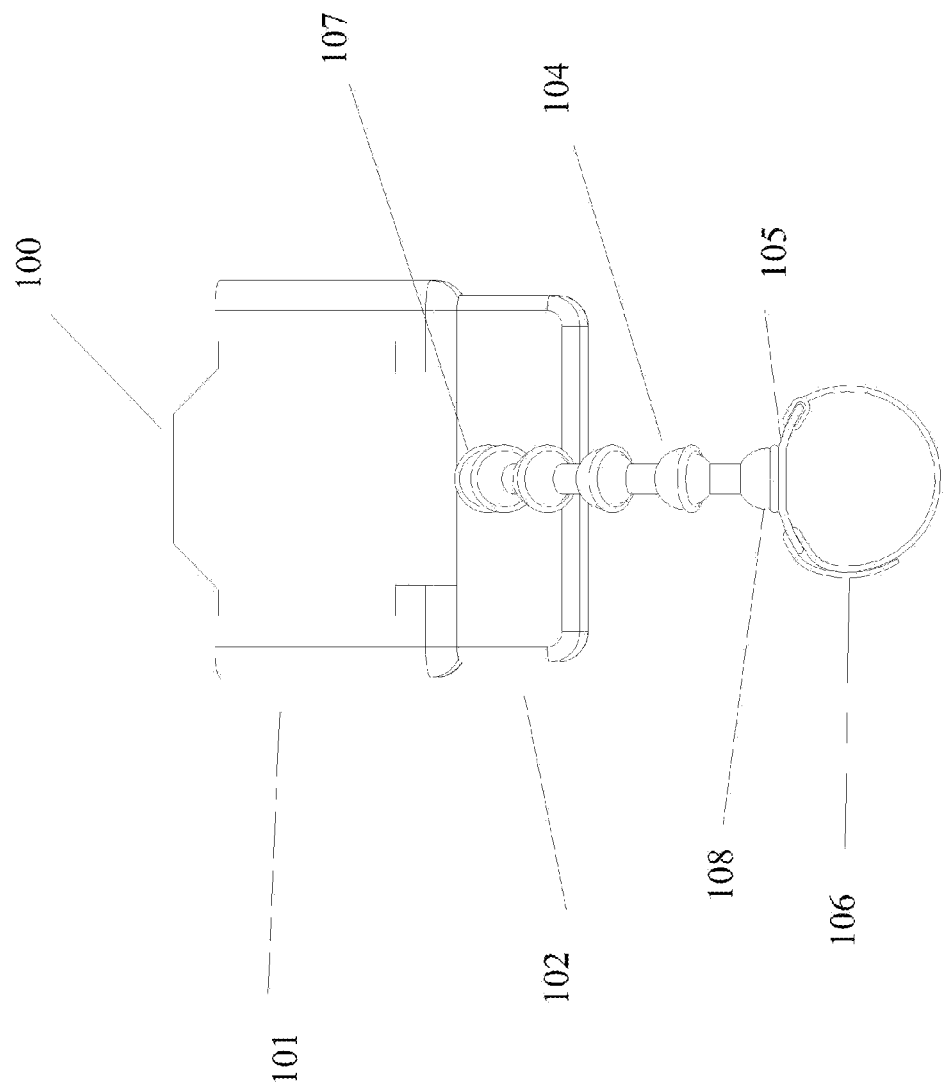
FIG. 3 is a back view of the camera mounting assembly.
Figure 4:
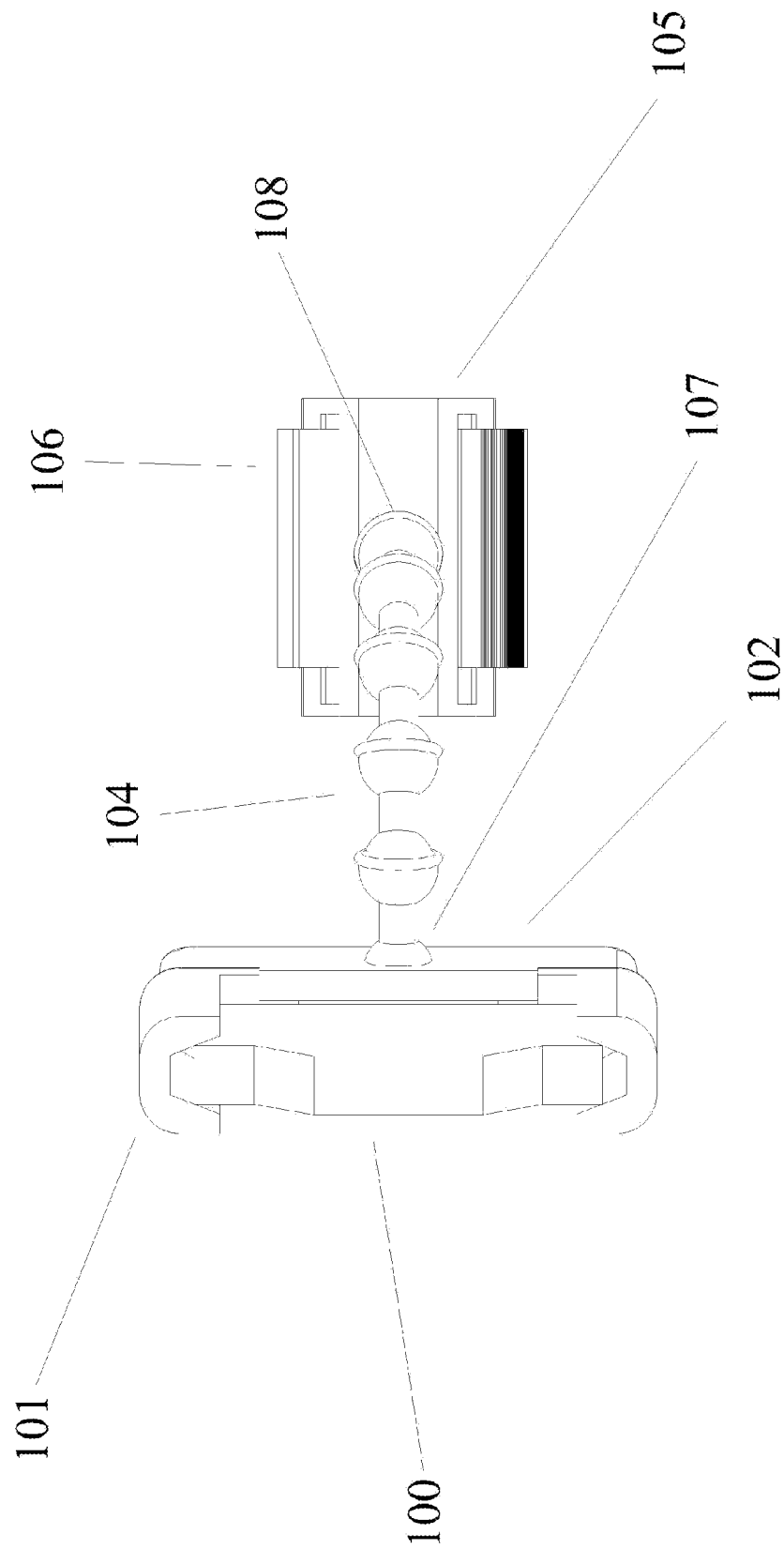
FIG. 4 is a top view of the camera mounting assembly.
Figure 5:
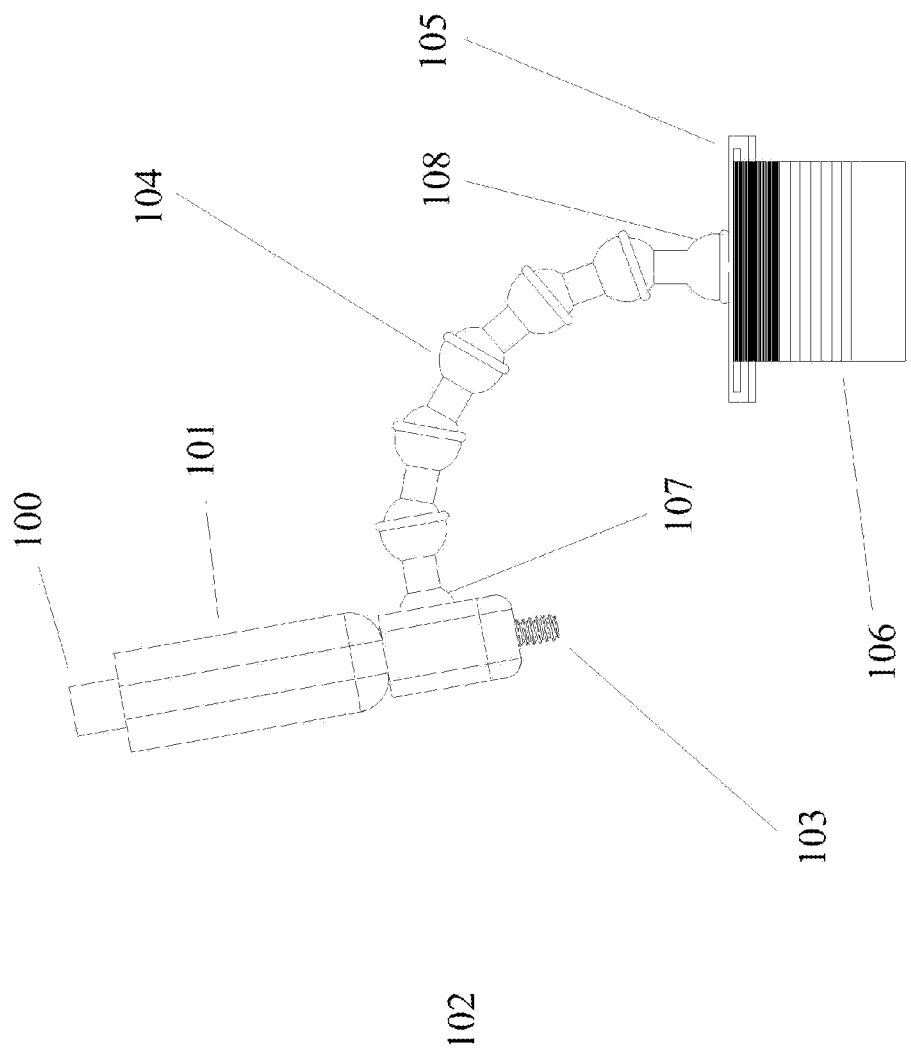
FIG. 5 is a side view of the camera mounting assembly.

The invention is carried out as illustrated in FIGS. 1-5. An attaching strap 106 made of Velcro is woven through two slots in a connecting plate 105 to form an enclosing shape that can fit around a sex toy. The sex toy can be either a dildo or a vibrator. The connecting plate 105 can be made of any lightweight but firm material such as a hard plastic, but is preferably made of a nylon GSM plastic. A flexible swiveling member 104 is securely connected with the connecting plate 105. The flexible swiveling member 104 can be made of any flexible material that allows a wide range of motion but is preferably made of an ABS plastic. The connecting plate 105 and the swiveling member 104 can be connected at a juncture 108 by any method that will hold tightly, but also allows the swiveling member 104 to rotate 360 degrees but is preferably attached by injection molding. Allowing the swiveling member 104 to be able to rotate a great deal is critical. The use of the sex toy will cause a great deal of motion and the camera has to be able to go with the motion and keep a consistent zoomed in view.

The swiveling member 104 is connected on its other end to a camera mounting enclosure 102. The camera mounting enclosure 102 can be made of any lightweight but sturdy material, but is preferably made of an ABS plastic. The camera mounting enclosure 102 and the swiveling member 104 can be connected at a juncture 107 by any method that will hold tightly, but also allows the swiveling member 104 to rotate 360 degrees but is preferably attached by injection molding. The camera mounting enclosure 102 has an open end that allows for a pair of gripper arms 101 to be securely mounted to the camera mounting enclosure 102. The bottom side of the camera mounting enclosure 102 has a screw 103 that allows the swiveling member 104 to be turned over and a digital camera to be mounted onto the screw so the camera mounting enclosure 102 can serve as a tripod.

FIG. 6 shows the inner workings of how the gripper arms 101 are constructed and how they fit into the camera mounting enclosure 102. The pair of gripper arms 101 can be made of any material that can provide sufficient support for a camera phone, but is preferably made of ABS plastic. The pair of gripper arms 101 need to be mounted on the camera mounting enclosure 102 in a secure way. This can be accomplished in a variety of ways but the preferred method is that the gripper arms 101 are securely mounted onto an arm connecting member 110 of a shape that matches the shape of an opening within the camera mounting enclosure 102 that runs the length of the camera mounting enclosure 102. The arm connecting members are slid into the opening because the opening runs the length of camera mounting enclosure 102 the width between the gripper arms 101 can be adjusted. The arm connecting members have holes within them that allows for a tension providing member 109. The tension providing member is preferably a spring 109. The spring can be chosen from a variety of springs including but not limited to: compression springs, torsion springs, clock springs, tension springs and cantilever springs. The width between the gripper arms 101 can be varied so that the gripper arms 101 either grip an adapter 100 or a camera phone. The adapter 100 can be made of any lightweight but sturdy material, but is preferably made of an ABS plastic. The adapter 100 allows a web cam to be mounted onto it.

If the gripper arms 101 are gripping a camera phone, the camera phone needs to have a way of communication that allows for the audio and video feeds to be transmitted in real time so that they can be viewed and heard in a different location from where the filming is occurring. This can be either through internet access or through Bluetooth communication. The web cam can be used similarly to send the files in real time through the internet to remote locations.

What is claimed is:

1. An apparatus for recording audio and visual files comprising:
   an attaching strap made of Velcro with a first end and a second end;
   a connecting plate made of a sturdy material with a front side and a back side and a slot on a left side end and a slot on a right side end;
   a swiveling member made of a flexible material with a first side end and a second side end;
   a camera mounting enclosure made of a rigid material of a shape sufficient to mount a camera with said camera mounting enclosure having a top side and a solid bottom side;
   a camera mounting member running through the center of said solid bottom side of said camera mounting enclosure;
   a first gripping arm and a second gripping arm wherein said first gripping arm is attached securely to a first arm connecting member and said second gripping arm is attached securely to a second arm connecting member;
   wherein said first arm connecting member comprises a first tension providing member and said second arm connecting member comprises a second tension providing member;
   wherein said first arm connecting member and said second arm connecting member are securely mounted to said camera mounting enclosure;
   wherein said first end of said attaching strap is adjustably slid through said slot on said left side end of said connecting plate and said second end of said attaching strap is adjustably slid through said slot on said right side end of said connecting plate to form an enclosing shape with said attaching strap;
   wherein said front side of said connecting plate is flexibly connected to said first side end of said swiveling member;
   wherein said second side end of said swiveling member is flexibly connected to said camera mounting enclosure.

2. The apparatus for recording audio and visual files of claim 1, wherein said camera mounting enclosure comprises an opening of a particular shape running along the length of said camera mounting enclosure near said top side of said camera mounting enclosure wherein said first arm connecting member and said second arm connecting member are of same said particular shape which allows said first arm connecting member and said second arm connecting member to slide into said opening;
   an endcap is securely attached to said camera mounting enclosure to cover up said opening after said first gripping arm and said second gripping arm have been securely slid into said camera mounting enclosure.

3. The apparatus for recording audio and visual files of claim 2, wherein said enclosing shape of said attaching strap is a shape that fits around a dildo or vibrator.

4. The apparatus for recording audio and visual files of claim 3, wherein said sturdy material of said connecting plate is a hard plastic and said connecting plate is connected to said swiveling member using injection molding.

5. The apparatus for recording audio and visual files of claim 4, wherein said hard plastic of said connecting plate is a nylon GSM plastic.

6. The apparatus for recording audio and visual files of claim 5, wherein said swiveling member, said first gripping arm, said second gripping arm, said first arm connecting member, said second arm connecting member and said camera mounting enclosure are made of a plastic.

7. The apparatus for recording audio and visual files of claim 6, wherein said plastic of said swiveling member, said first gripping arm, said second gripping arm, said first arm connecting member, said second arm connecting member and said camera mounting enclosure is ABS plastic.

8. The apparatus for recording audio and visual files of claim 7, wherein said camera enclosing member is connected to said swiveling member using injection molding.

9. The apparatus for recording audio and visual files of claim 8, wherein said camera mounting member is a standard ¼ inch camera mounting screw made of stainless steel.

10. The apparatus for recording audio and visual files of claim 9, wherein said first tension providing member of said first arm connecting member is a first spring embedded within said first arm connecting member and said second tension providing member of said second arm connecting member is a second spring embedded within said second arm connecting member wherein said first spring and second spring is selected from the group consisting of compression springs, torsion springs, clock springs, tension springs and cantilever springs.

11. An apparatus for recording audio and visual files comprising:
   an attaching strap made of Velcro with a first end and a second end;
   a connecting plate made of a sturdy material with a front side and a back side and a slot on a left side end and a slot on a right side end;
   a swiveling member made of a flexible material with a first side end and a second side end;
   a camera mounting enclosure made of a rigid material of a shape sufficient to mount a camera with said camera mounting enclosure having a top side and a solid bottom side;
   a camera mounting member running through the center of said solid bottom side of said camera mounting enclosure;
   a first gripping arm and a second gripping arm wherein said first gripping arm is attached securely to a first arm connecting member and said second gripping arm is attached securely to a second arm connecting member;
   wherein said first arm connecting member comprises a first tension providing member and said second arm connecting member comprises a second tension providing member;
   wherein said first arm connecting member and said second arm connecting member are securely mounted to said camera mounting enclosure;
   wherein said first end of said attaching strap is adjustably slid through said slot on said left side end of said connecting plate and said second end of said attaching strap is adjustably slid through said slot on said right side end of said connecting plate to form an enclosing shape with said attaching strap;

wherein said front side of said connecting plate is flexibly connected to said first side end of said swiveling member;

wherein said second side end of said swiveling member is flexibly connected to said camera mounting enclosure;

wherein said first gripping arm and said second gripping arm are set at a specific width that allows said first gripping arm and said second gripping arm to securely grip an adapter;

wherein said adapter can securely mount a webcam.

12. The apparatus for recording audio and visual files of claim 11, wherein said camera mounting enclosure comprises an opening of a particular shape running along the length of said camera mounting enclosure near said top side of said camera mounting enclosure wherein said first arm connecting member and said second arm connecting member are of same said particular shape which allows said first arm connecting member and said second arm connecting member to slide into said opening;

an endcap is securely attached to said camera mounting enclosure to cover up said opening after said first gripping arm and said second gripping arm have been securely slid into said camera mounting enclosure.

13. The apparatus for recording audio and visual files of claim 12, wherein said enclosing shape of said attaching strap is a shape that fits around a dildo or vibrator.

14. The apparatus for recording audio and visual files of claim 13, wherein said sturdy material of said connecting plate is a hard plastic and said connecting plate is connected to said swiveling member using injection molding.

15. The apparatus for recording audio and visual files of claim 14, wherein said plastic of said swiveling member, said first gripping arm, said second gripping arm, said first arm connecting member, said second arm connecting member, said camera mounting enclosure and said adapter is ABS plastic.

16. The apparatus for recording audio and visual files of claim 15, wherein said first tension providing member of said first arm connecting member is a first spring embedded within said first arm connecting member and said second tension providing member of said second arm connecting member is a second spring embedded within said second arm connecting member wherein said first spring and second spring is selected from the group consisting of compression springs, torsion springs, clock springs, tension springs and cantilever springs.

* * * * *